(12) United States Patent
Lodhia et al.

(10) Patent No.: US 10,673,722 B2
(45) Date of Patent: Jun. 2, 2020

(54) SEARCH RESULT SUGGESTIONS BASED ON DYNAMIC NETWORK LATENCY CLASSIFICATION

(71) Applicant: Uber Technologies, Inc., San Francisco, CA (US)

(72) Inventors: Jatin H. Lodhia, Oakland, CA (US); Rajesh Mahindra, Newark, CA (US); Arun Babu Arunachalam Sankaralingam Pragasam, Karnataka (IN)

(73) Assignee: Uber Technologies, Inc., San Francisco, CA (US)

( * ) Notice: Subject to any disclaimer, the term of this patent is extended or adjusted under 35 U.S.C. 154(b) by 45 days.

(21) Appl. No.: 16/182,456

(22) Filed: Nov. 6, 2018

(65) Prior Publication Data

US 2020/0145310 A1    May 7, 2020

(51) Int. Cl.
*H04L 12/26* (2006.01)
*G06F 16/951* (2019.01)
(Continued)

(52) U.S. Cl.
CPC .... *H04L 43/0852* (2013.01); *G06F 16/24539* (2019.01); *G06F 16/951* (2019.01); *G06F 16/9535* (2019.01); *H04L 43/0864* (2013.01); *H04L 43/16* (2013.01); *H04L 43/50* (2013.01); *H04L 67/2842* (2013.01);
(Continued)

(58) Field of Classification Search
CPC ......... H04L 29/06884; H04L 29/06897; H04L 29/0809; H04L 43/00; H04L 43/04; H04L 43/08–0817; H04L 43/0852–087; H04L 43/10–50; H04L 65/80; H04L 67/02; H04L 67/06; H04L 67/18; H04L 67/28; H04L 67/2842–2861; H04L 67/306; H04L 67/32–327; G06F 12/0862; G06F 2212/602–6028; G06F 16/144–148; G06F 16/24539; G06F 16/95–9538; H04W 4/00–029
See application file for complete search history.

(56) References Cited

U.S. PATENT DOCUMENTS

2003/0028694 A1\* 2/2003 Aboulenein ........ G06F 13/4031
 710/107
2014/0269269 A1\* 9/2014 Kovvali ................ H04W 24/08
 370/229
(Continued)

*Primary Examiner* — Brendan Y Higa
(74) *Attorney, Agent, or Firm* — Fenwick & West LLP

(57) ABSTRACT

An application on a mobile device, in response to received partial queries from users, displays suggested results based upon the received partial query, allowing the user to select a suggested result without having to input the complete query. In order to ensure that suggested results can be provided to the user in a timely manner, the application determines an expected latency of a network connection of the mobile device by periodically measuring the latency of network requests and predicting an expected future latency based upon the measured latency values. Based upon the expected latency, the application may retrieve the suggested results from a server, or from a local cache storing results of previous queries by the users as well as popular results associated with a geographic area of the user, or some combination thereof.

20 Claims, 8 Drawing Sheets

(51) Int. Cl.
*G06F 16/2453* (2019.01)
*H04L 29/08* (2006.01)
*G06F 16/9535* (2019.01)
*H04L 29/06* (2006.01)

(52) U.S. Cl.
CPC .......... *H04L 67/2847* (2013.01); *H04L 67/32* (2013.01); *H04L 67/327* (2013.01); *G06F 2212/6024* (2013.01); *G06F 2212/6028* (2013.01); *H04L 67/42* (2013.01)

(56) References Cited

U.S. PATENT DOCUMENTS

2016/0371795 A1* 12/2016 Chrapko ................ G06Q 30/02
2017/0163509 A1*  6/2017 Li ....................... H04L 43/0864

* cited by examiner

SEARCH RESULT SUGGESTIONS BASED ON DYNAMIC NETWORK LATENCY CLASSIFICATION

BACKGROUND

Field of Art

This disclosure relates generally to the field of network systems, and in particular to network latency analysis.

Description of Art

Mobile devices often contain applications that communicate with an application server in order to perform various functions. For example, a user of an application on a mobile device may input a query to perform a search (e.g., for products, locations, and the like). As the user inputs the query, the application may access a server and retrieve suggested results to be displayed to the user, allowing the user to select a suggested result without having to fully type out the query.

However, changing network conditions may impact the ability of the application to communicate with the server, potentially negatively affecting user experience. For example, if the application, due to high network latency, is unable to present suggested results in response to user inputs in a timely manner, the user may find the application frustrating and cumbersome to use. As such, there exists a need for an application to be able to assess characteristics of a network connection, and to be able to adjust application behavior accordingly in order to maintain a positive user experience by providing the user relevant information in response to a received query in a timely manner.

SUMMARY

The above and other needs are met by methods, non-transitory computer-readable storage media, and computer systems for predicting expected network latency, and adjusting behavior of application based upon expected network latency.

For example, in some embodiments, an application on a mobile device, in response to received partial queries from users, displays suggested results based upon the received partial query, allowing the user to select a suggested result without having to input the complete query. In order to ensure that suggested results can be provided to the user in a timely manner, the application determines an expected latency of a network connection of the mobile device by periodically measuring the latency of network requests and predicting an expected future latency based upon the measured latency values. Based upon the expected latency, the application may retrieve the suggested results from a server, or from a local cache storing results of previous queries by the users as well as popular results associated with a geographic area of the user, or some combination thereof.

Examples described herein provide a computer-implemented method for determining an expected network latency of a mobile device. In one example, the method includes estimating an initial network latency category for the mobile device (e.g., based upon a connection type) indicating an expected amount of network latency of a connection to a server established by the mobile device. Upon determination of the initial network latency category of the mobile device, the network latency category can be updated based upon measured latency values of monitored network calls to a server by the mobile device. For example, updating the network latency category may comprise determining an amount of latency of a network call to the server performed by the mobile device during a designated period of time over the established connection of the mobile device, storing the determined latency in a network latency buffer configured to store determined latency amounts corresponding to network calls performed during a plurality of previous periods of time, and identifying a set of weights corresponding to each of the determined latency amounts stored by the network latency buffer, the set of weights based upon at least one previously predicted network latency. An expected amount of network latency may be predicted based upon the determined latency amounts stored by the network latency buffer and the corresponding identified set of weights. The network latency category is updated based upon the predicted expected network latency and at least one previously predicted network latency. The updated network latency category may be used to specify certain behaviors of an application. For example, the application may generate results in response to a user input received at a user interface, where generating the results comprises determining whether to retrieve one or more results from a local results cache of the mobile device, based upon the network latency category for the mobile device. For example, the application may, if the network latency category indicates low latency, retrieve the results from a remote server, while retrieving the results from the local cache if the network latency category is expected to be high.

Examples described herein further provide a computer-implemented method for retrieving results in response to a received user query at a mobile device. In some embodiments, input from a user corresponding to at least a portion of a query is received at a user interface of the mobile device. The mobile device may comprise retrieve results from a remote server, or from a local results cache that includes at least a first set of stored results corresponding to results of previous queries received from the user (e.g., user-specific results), and a second set of results corresponding to historical results previously retrieved from the server. The mobile device identifies a level of network latency associated with a current connection of the mobile device, and may alter how it retrieves results based upon the identified network latency. For example, in some embodiments, the mobile device may provide a first portion of results from the locally stored first set of results, and a second portion of results retrieved from the remote server, if the determined network latency is low, and/or from the second set of results stored by the local cache, if the determined network latency is low.

Examples described herein further provide a computer-implemented method for presenting suggested search results in response to at least a portion of a user-submitted query. In some embodiments, an input from a user corresponding to at least a portion of a query is received at a user interface of a mobile device. In response, the mobile device retrieving, from a results cache, a first subset of results from a first set of stored results corresponding to results of previous queries received from the user, based upon the received query portion. In addition, the mobile device retrieves a second subset of results corresponding to results of previous queries associated with a plurality of users, and determines, for each result of the second subset of results, a match measure indicating a level at which the result matches the received query portion, and a popularity measure indicating a historical popularity level of the result among the plurality of users. In some embodiments, the second subset of results may be from a second set of results stored by the results cache corresponding to historical results previously retrieved from a remote server, or retrieved directly from the remote server, based upon a determined latency of a network connection of the mobile device. The mobile device is then able to display to the user a list of results comprising the first subset of results and at least a portion of the second subset of results based, wherein the portion of the second subset of results are selected based upon an aggregate measure for each result based upon the match measure and the popularity measure for the result.

The features and advantages described in this summary and the following detailed description are not all-inclusive. Many additional features and advantages will be apparent to one of ordinary skill in the art in view of the drawings, specification, and claims hereof.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Applications installed on mobile devices may interact with application servers over the network, allowing a user of the applications to perform various functions. For example, a user may utilize a particular application to search for products or locations, interact with other users, and the like. In some embodiments, a user may, via a user interface presented by the application, input at least a portion of a query to search for a product or location. In response, the application may retrieve from an application server potential results corresponding to the received portion of the query to be displayed to the user as suggestions, allowing for the user to select a suggestion without having to input the query in its entirety.

However, in some cases, changing network conditions may affect the ability of the application to communicate with the application server. For example, if network latency is high, the application may not be able to retrieve potential results from the server quickly enough to be useful to the user, resulting in a degradation of user experience. In addition, high network latency may cause the application to erroneously indicate that the network connection has timed out when network calls are still being processed. As such, it may be useful for the mobile device to be able to accurately assess network conditions, and to be able to alter application behavior based upon expected network conditions.

Figure 1:
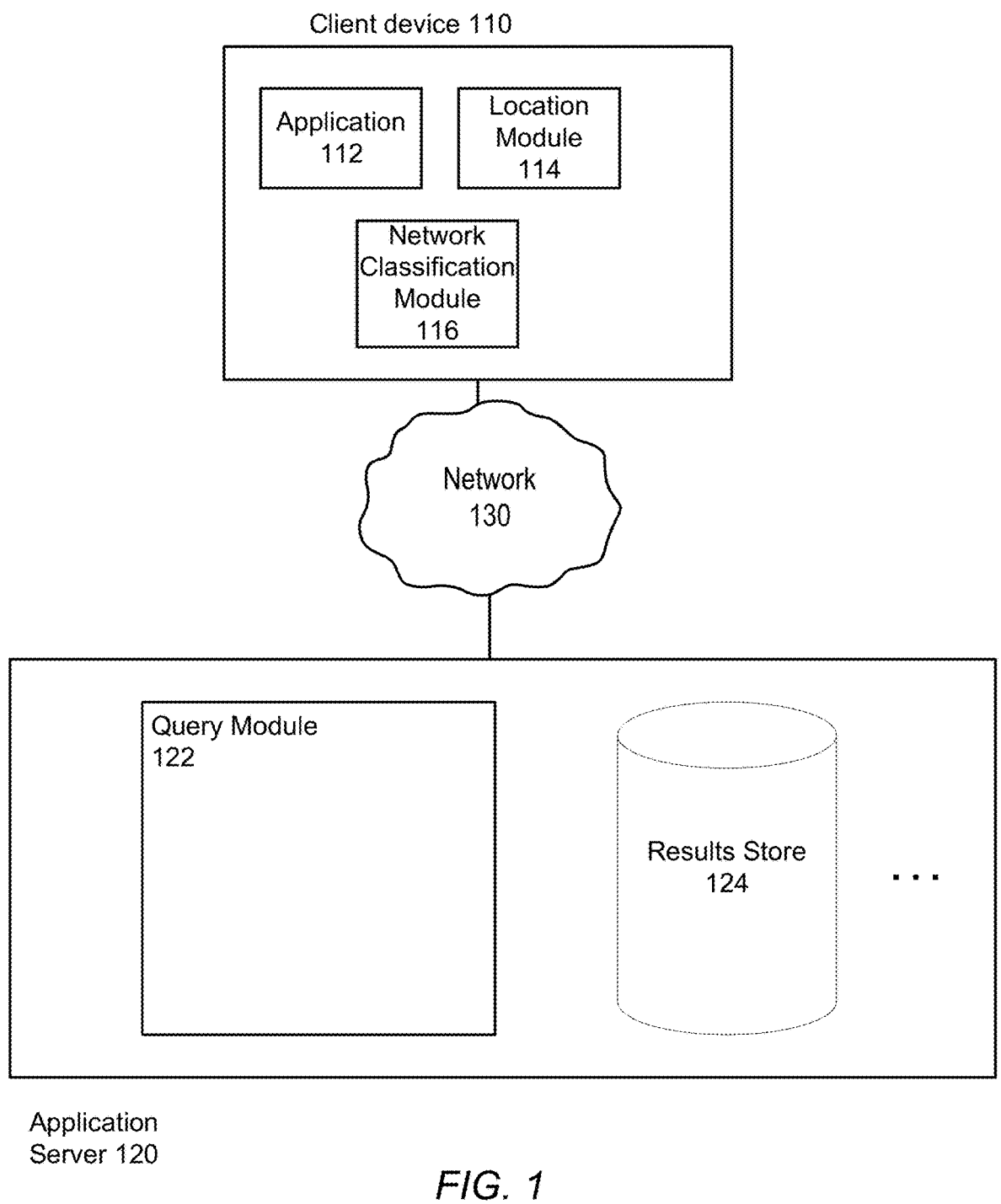
FIG. 1 is a high-level block diagram of a system environment for a system, in accordance with some embodiments.

FIG. 1 is a block diagram of a system environment, in accordance with some embodiments. FIG. 1 includes a client device 110 in communication with an application server 120. In some embodiments, the client device 110 and the application server 120 communicate with each other via a network 130. The network 130 may comprise any combination of local area and wide area networks employing wired or wireless communication links. In some embodiments, all or some of the communication on the network 130 may be encrypted.

For clarity, only one client device 110 and one application server 120 are shown in FIG. 1. Alternate embodiments of the system environment can have any number of client devices 110 as well as multiple application servers 120. The functions performed by the various entities of FIG. 1 may vary in different embodiments.

The client device 110 may correspond to any type of device operable by a user to execute applications to communicate with the application server 120, such as a personal or mobile computing device, e.g., a smartphone, tablet, notebook computer, and the like. The client device 110 comprises an application 112, a location module 114, and a network classification module 116. In some embodiments, the application 112 uses an application programming interface (API) to communicate with the application server 120 (e.g., via the network 130). The client device 110 may comprise a display to display information to the user, as well as one or more input devices, such as a mouse, keyboard, touchscreen, etc., allowing the user to input data via an interactive user interface.

The user may operate the application 112 to perform various functions. For example, in some embodiments, the user may enter origin and/or destination information using a user interface provided by the application 112, in order to request a transportation service. In other embodiments, the user may use the application 112 to search for products or services for purchase, search for other users on a social network, and the like. As used herein, a "query" may refer to any user input for searching for a desired result. For example, a user may search for a desired location, such as "San Francisco International Airport" by entering, at a user interface provided by the application 112, a query such as "San Francisco International Airport," "San Francisco Airport," "sfo," and the like, in order to request transportation to or from the location, obtain a map of the location, etc.

The application 112 on the client device 110 may communicate with the application server 120 to receive information corresponding to user inputs, and can present information received from the application server 120 on a user interface, such as results of a search, a map of a geographic region associated with the current location of the client device 110, and the like. The client device 110 may be able to determine the current location and provide the current location to the application server 120 (e.g., using the location module 114).

In some embodiments, how the application 112 communicates with the application server 120 may be based upon a state of the connection between the client device 110 and the application server 120 through the network 130. For example, how the application 112 provides suggested results in response to a received portion of a query from the user may be different depending upon network connection conditions (described in greater detail below).

The location module 114 is configured to determine a geographic location of the client device 110. In some embodiments, the location module 114 determines the location of the client device 110 using a global positioning system (GPS) receiver. In some embodiments, other types of location determination techniques may also be used, such as Wi-Fi positioning, cell tower triangulation, and the like. The determined location of the client device 110 may be used by the application 112 and/or the application server 120 when providing data to the user. For example, when searching for locations responsive to a user query, the application server 120 may restrict the search to locations within a particular distance from the geographic location of the client device 110, or within a particular geographic region containing the geographic location (e.g., a particular city, state, etc.).

The network classification module 116 is configured to determine a network classification for the connection of the client device 110 to the network 120, based upon one or more attributes of the network connection of the client device 110 to the application server 120. In some embodiments, the network classification is based upon a determined latency of the client device's 110 connection to the application server 120 via the network 130. In some embodiments, the network classification corresponds to one of a plurality of categories, each category corresponding a particular range of values of a network connection attribute (e.g., latency).

In some embodiments, certain types of operations performed by the application 112 may place a greater emphasis on the speed at which communications between the application 112 and application server 120 are able to take place (e.g., latency) over the amount of data that can be transmitted in the communications (e.g., bandwidth). For example, where the application is configured to provide suggested results as the user is inputting a query at the client device 110, the suggested results may only be useful to the user if they are able to be provided in a timely manner. If the time taken to provide suggested results is too great, user experience may be negatively affected. As such, the network classification module 116 may classify the network connection based upon latency instead of bandwidth.

In some embodiments, the network classification module 116 may determine an initial network classification based upon a type of network connection of the client device 110 and a current location of the client device (e.g., as determined by the location module 114). The network classification module 116 may then periodically update the network classification based upon monitored network calls performed by the application 112 to communicate with the application server 120. The determined network classification may be used by the application 112 to determine certain behaviors (e.g., implement a particular behavior policy corresponding to the network classification). For example, in one embodiment, the application 112 may change the way it suggests results to the user based upon the network classification, alter how the application 112 alerts for potential time-outs, and the like, based upon a behavior policy corresponding to the network classification.

While FIG. 1 illustrates the location module 114 and network classification module 116 as being separate from the application 116, in some embodiments, one or more of the location module 114 and the network classification module 116 are implemented as part of the application 112.

The application server 120 is configured to perform one or more application functions based upon received communications from the application 112 of the client device 110. For example, the application server 120 may receive requests from a user of the client device 110, and return search results to be displayed to the user by the application 112 on the client device 110. In addition, the application server 120 may perform additional functions, such as scheduling transportation to a received location, generating directions to a received location, performing a transaction to purchase a specified product, send a message to a specified person on a social network, and the like.

As illustrated in FIG. 1, the application server 120 comprises a query module 122 and a results store 124. The query module 122 is configured to process queries or portions of queries received by the application 112 on the client device 110. For example, as the user of the client device 110 is entering a query, the application 112 may transmit to the application server 120 the received portions of the query. The query module 122 may analyze the received portions and identify one or more suggested results to be transmitted back to the application 112 to be displayed to the user. As such, the user may be able to view suggested results as they are inputting a query, potentially allowing the user to select a suggested result in response to the input of only a partial query. As suggested results may quickly become outdated as the user continues to input the query, it is helpful to the user if the suggested results can be received by the application 112 and displayed to the user quickly.

The results store 124 stores results that may be provided to the application 112 as suggestions in response to a received portion of a user query (e.g., as determined by the query module 122). In some embodiments, the stored results correspond to an aggregation of results of previously submitted user queries. Each stored result may be associated with a popularity value, indicating a quantity or frequency at which the result satisfied previously received queries by a plurality of users of the application 112. In some embodiments, the stored results may be categorized based upon one or more attributes, such as geographic location.

Figure 2:
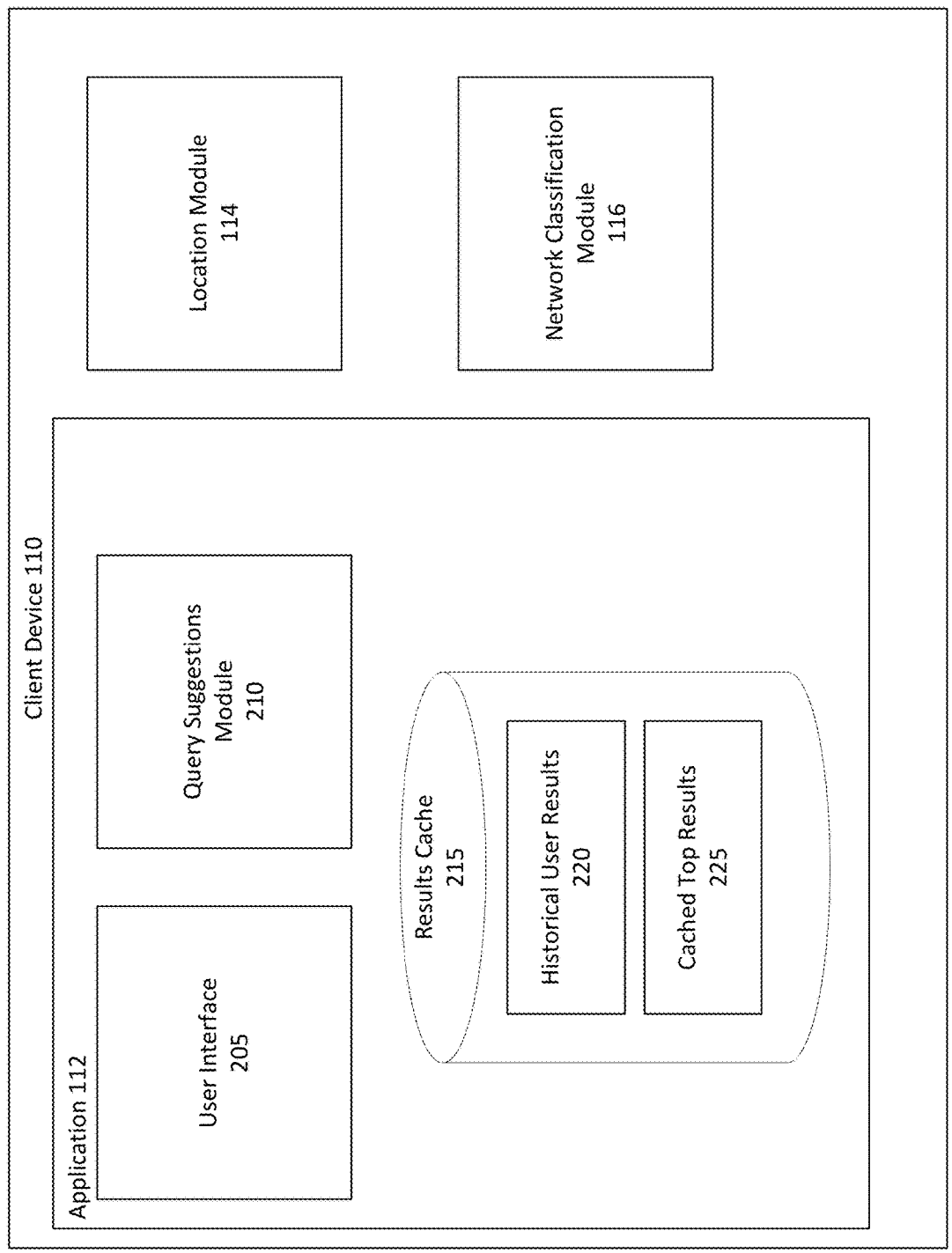
FIG. 2 is a block diagram of a client device, in accordance with some embodiments.

FIG. 2 is a block diagram of a client device, in accordance with some embodiments. Similar to FIG. 1, the client device 110 illustrated in FIG. 2 comprises an application 112 and a location module 114. The application 112 comprises a user interface module 205, a query suggestions module 210, and a results cache 215.

The user interface 205 is configured to display one or more interactive elements to the user of the client device 110, allowing the user to provide inputs to the application 112. For example, the user interface 205 may comprise a text field to be displayed to the user, allowing the user to input a query. As discussed above, in some embodiments, the query may correspond to a request for a particular location indicating a destination for a transportation. As the user inputs the query into the text field, the user interface 205 may display suggested results to the user as determined by the query suggestions module 210 in response to currently input partial query.

The query suggestions module 210 is configured to provide suggestions to the user as the user inputs a query at the user interface 205. The query suggestions module 210 receives a current input that has been provided by the user at the user interface 205 (e.g., a partial query), and compares the currently received user input to a plurality of potential results, and identifies at least one suggested result based upon the comparisons. In addition, the query suggestions module 210 may sort a plurality of potential results based upon one or more criteria to generate suggested results to be displayed to the user. This may allow for the user to select a desired result from the displayed suggested results, without having to type out the desired result in its entirety. For example, in an embodiment where the user uses the application to query for a location, the application 112 may suggest the result "San Francisco International Airport" in response to the user entering the characters "airport," "sfo," or "san francisco airport." In some embodiments, the suggested results may be determined based upon a level of similarity to the user input, a current geographic location of the client device 110, whether the user had previously searched for the location before, a popularity of the location, and the like.

The query suggestions module 210 may retrieve the suggested results locally from the results cache 230 or remotely from application server 120 (e.g., the results store 124). For example, the query suggestions module 210 may determine a first set of suggested results using the results cache 230, as well as request from the application server a second set of suggested results to be retrieved from the results store 124. In some embodiments, the query suggestions module 210 aggregates all suggested results retrieved from the results cache 230 and results store 124, and sorts the suggested results by one or more criteria (e.g., popularity, distance, match to the receiver query, etc.).

The results cache 215 comprises locally stored potential results that may be used as suggestions for a received user query. In some embodiments, the potential results stored by the results cache 215 may be divided into historical user results 220 and cached top results 225.

The historical user results 220 correspond to stored query results previously queried by the user. In some embodiments, the historical user results 220 correspond to any results that had been previously selected by the user as satisfying a user query. In other embodiments, the historical user results 220 may correspond to results to which the user performed at least one additional action. For example, where the query and results correspond to locations, the historical user results 220 may comprise locations previously queried by the user and actually travelled to by the user in response to the query. In embodiments where the query and results correspond to products, the historical user results 220 may comprise results corresponding to products actually purchased by the user.

In some embodiments, the historical user results 220 comprise all results associated with the user. In other embodiments, the historical user results 220 stores a set number of results (e.g., 100 most recent results), all results within a predetermined period of time (e.g., within the last month), or some combination thereof.

The cached top results 225 may correspond to results previously queried by a plurality of users of the application 112 (e.g., all users of the application 112, all users of the application 112 within a particular geographic region, etc.). For example, the application 112 may be installed on many different client devices 110 used by many different users. In some embodiments, as different users of the application 112 select results in response to submitted queries, the application server 120 records the results (e.g., in the results store 124) to form a record of results that have been historically selected by the different users of the application 112. The recorded results may be categorized and sorted based on search frequency, location, and the like. For example, in some embodiments, the recorded results in the results store 124 may be divided between different geographical regions (e.g., neighborhoods, cities, states), and sorted within the different geographical regions to indicate the most commonly searched-for results in each of a plurality of geographic regions. In some embodiments, the recorded results in the results store 124 may be sorted by users associated with different geographic regions. As such, while the historical user results 220 comprise historical results associated with a specific user of the client device 110, the results store 124 comprises aggregated historical results across many users.

In some embodiments, the application 112 periodically accesses the application server 120 to retrieve a subset of the results for one or more geographic regions associated with the client device 110 (e.g., the most commonly searched-for results of the geographic region) and/or a subset of results for users associated with the one or more geographic regions. In some embodiments, the geographic regions correspond to a current location of the client device 110. In other embodiments, the geographic regions correspond to regions associated with the user of the client device 110 (e.g., a region where the user's "home" is located). As such, the cached top results 225 comprise a subset of the results of the results store 124. For example, while the results store 124 may store millions of results corresponding to thousands of different geographic regions, the cached top results 225 may comprise the top 1000 or top 10,000 results for a limited set of regions. In some embodiments, the amount and scope of results stored by the cached top results 225 may be configurable by the user of the client device 110. For example, if the user expects to be within a particular geographic region over a certain period of time, the user may configure the cached top results 225 to retrieve results associated with the geographic region from the results store 124 on the application server 120. In addition to subset of results, the application 120 may also download metadata associated with each result, such as search frequency data corresponding to each result (e.g., a number or frequency which the result was searched, a number or frequency which a location corresponding to the result was traveled to, etc.).

In some embodiments, the application 112 automatically downloads the subset of results (e.g., top N results for one or more geographic regions) from the application server 120 on a periodic basis (e.g., once per week, month, etc.) to populate the cached top results 225, in order to ensure that the cached top results 225 accurately reflects a current state of results on the application server 120 and does not become too stale. In addition, the user may manually request download of results from the application server 120 for updating the cached top results 225. In some embodiments, the application 112 will only download the subset of results from the application server 120 under certain conditions, in order to avoid degrading user experience when using the application 112. For example, if the user is actively using the application 112, the application 112 may not initiate download of the subset of results, or pause a currently in-progress download. In addition, the application 112 may only download the subset of results under certain network conditions, such as when the mobile device is able to connect to the application server 120 through a Wi-Fi network (e.g., in order to avoid the user being charged for cellular data usage). As such, when the application 112 is downloading the subset of results from the application server 120, the application 112 may pause or suspend the download if it detects the user actively using the application 112, or if the network connection changes (e.g., from Wi-Fi to another connection type such as 3G). When desirable conditions have been restored (e.g., the user stops using the application 112, the network connection changes back to Wi-Fi), then the application 112 may resume the download.

As discussed above, in some embodiments, the behavior of the application 112 may change based upon one or more characteristics of the network connection between the client device 110 and the application server 120. For example, the query suggestions module 210, in response to a received portion of a query from a user of the client device 110, may identify suggested results from the cached top results 225 of the local results cache 215, or from the results store 124 on the application server 120. While the results store 124 on the application server contains a larger, more up-to-date set of results, potentially allowing for more relevant suggested results to be identified, if network latency is high, the suggested results may not be able to be displayed to the user in time to be useful. As such, the query suggestions module 210 may determine whether to identify suggested results using the local results cache 215 or the remote results store 124 based upon an expected latency of the network connection, as determined by the network classification module 116.

In addition to the identification of suggested results, other operations of the application 112 may be adjusted based upon the determined level of network latency. For example, in some embodiments the application 112 displays a timeout alert in response to the application server 120 not responding to requests within a threshold amount of time such that the application 112 can infer that the connection between the client device 110 and application server 120 has been broken. The threshold amount of time after which the application 112 displays the time out alert may be adjusted based upon an expected level of latency of the network connection. For example, if the network connection is expected to have a high level of latency, the application 112 may wait for a longer period of time before displaying a time-out alert compared to if the network connection is expected to have a low level of latency.

Figure 3:
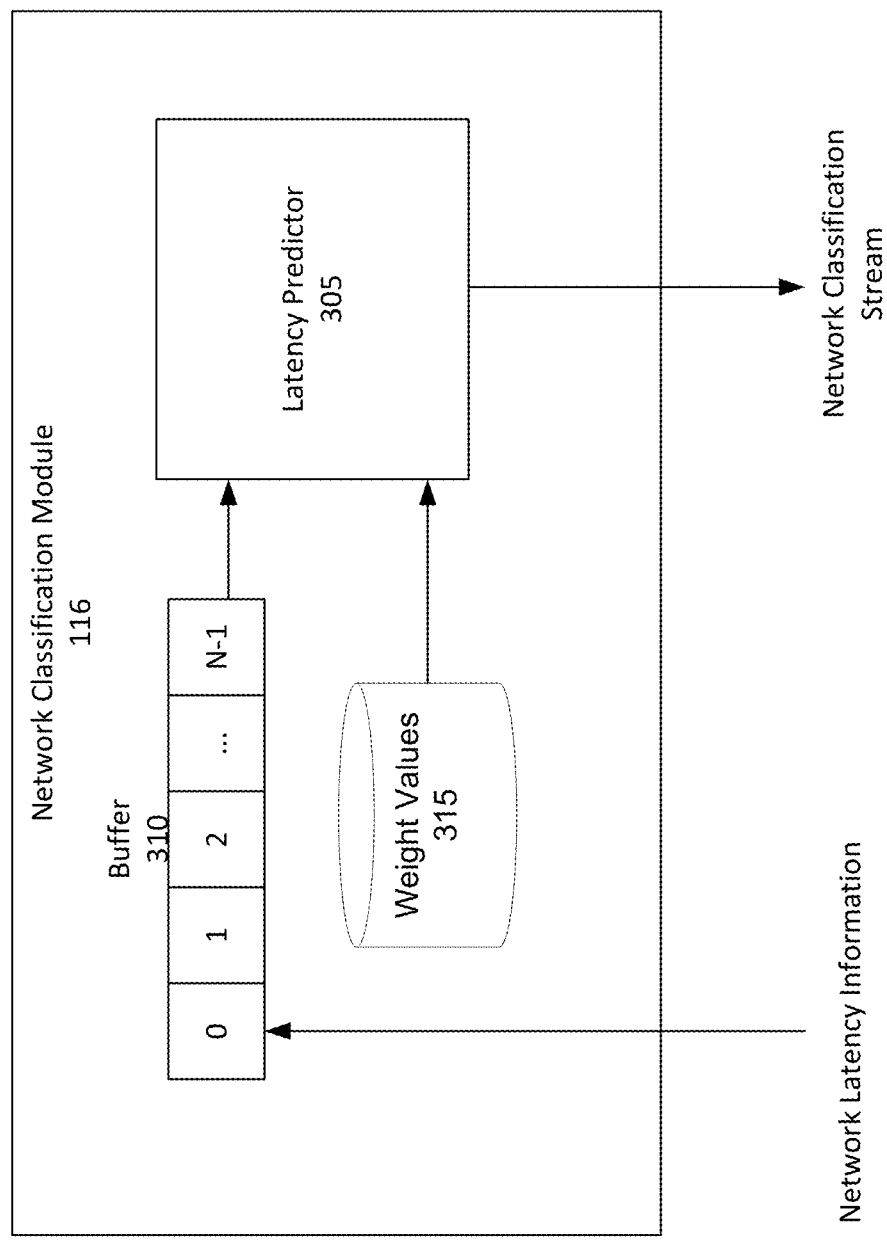
FIG. 3 is a block diagram of a network classification module that may be implemented on a client device, in accordance with some embodiments.

FIG. 3 is a block diagram of a network classification module that may be implemented on a client device 110, in accordance with some embodiments. The network classification module 116 comprises a latency predictor module 305, a latency buffer 310, and one or more sets of stored weight values 315.

The latency predictor module 305 is configured to predict an expected latency of the network connection of the client device 110. In some embodiments, the latency predictor module 305 determines the expected latency over a particular time frame, and classifies the value of the expected latency into one of a plurality of latency categories, each category corresponding to a predetermined range of latency values. Table 1 below illustrates possible latency categories that may be used in some embodiments.

TABLE 1

| Latency Category | Latency Range |
|---|---|
| Magic | 0 to 0.5 seconds |
| Fast | 0.5 to 1.5 seconds |
| Medium | 1.5 to 3 seconds |
| Slow | >3 seconds |

It is understood that the above latency categories and latency ranges are provided for purpose of example, and that in other embodiments, different categories may be used that correspond to different ranges.

In some embodiments, the latency predictor module 305 generates an initial prediction of the latency of the network connection (referred to as a bootstrap prediction), and then updates the bootstrap prediction based upon the measured latency values of one or more monitored network calls. In some embodiments, the bootstrap prediction may be based upon a type of network connection that the client device 110 is on, and a current location of the client device 110. For example, the latency predictor module 305 queries an operating system (OS) of the client device 110 to determine a current network connection type, which may include Wi-Fi, Long-Term Evolution (LTE), High Speed Packet Access (HSPA), Evolved High Speed Packet Access (HSPA+), Enhanced Data Rates for GSM Evolution (EDGE), and the like. In some embodiments, different operating systems may use different names for the same network connection type, and the latency predictor module 305 may reconcile the received network connection type data into a standard format.

In addition, the latency predictor module 305 determines a current location of the client device 110 from the location module 114, which may correspond to a particular geographic region (e.g., a country). Each combination of network connection type and region may be mapped to a particular latency category. In some embodiments, the latency predictor module 305 accesses a stored look-up table in order to determine the bootstrap prediction based upon the obtained network connection type and region data. In some embodiments, the look-up table is stored locally by the client device. In other embodiments, the look-up table is stored on the application server 120, and accessible by the latency predictor module 305 through the network 130.

Table 2 below illustrates an example mapping of geographic regions and network connection types to latency categories, in accordance with some embodiments. For example, as illustrated in FIG. 2, if the latency predictor module 305 receives from the OS of the client device 110 an indication that the current network connection is HSPA and from the location module 114 an indication that the current location of the client device 110 is within the region of India, then the latency predictor module 305 determines the category of the bootstrap prediction to be "medium."

TABLE 2

|  | India | US | China | Other |
|---|---|---|---|---|
| Magic (0-0.5 s) |  | LTE, Wifi | LTE, Wifi, HSPA+ |  |
| Fast (0.5-1.5 s) | LTE, Wifi, HSPA+ | HSPA+ | HSPA | LTE, Wifi, HSPA+ |
| Medium (1.5 s-3 s) | HSPA | HSPA |  | HSPA |
| Slow (3 s+) | Edge | Edge | Edge | Edge |

In some embodiments, the mapping between network connection types and regions to latency categories is based upon latency data collected from status requests performed using the different network connection types within the region over a period of time. For example, the application server 120 or other server may receive collected latency data from a plurality of client devices 110 within each region, and determine a distribution of latency values for status requests performed using different types of network connections. A given network connection type may be classified under a particular latency category if at least a threshold percentage (e.g., 75%) of requests using the network connection type finish within the maximum latency allowed in that category (e.g., as measured by an elapsed time between the transmission of a request to a server by a client device and the receipt of the response by the client device). For example, if 75+% of LTE requests in a given region (e.g., the US) are able to complete within 500 ms, then LTE will fall under the "magic" category for the region. Because the same type of network connection (e.g., LTE) may perform differently in different regions (e.g., due to different levels of infrastructure), the same network connection type may be mapped to different latency categories for different regions.

Since the network infrastructure of various regions may change, the mappings between latency categories and connection type/region may change over time. In some embodiments, the application server 120 may update the mappings as additional latency data is received. In some embodiments, the application server 120 updates the look-up table stored on the client device 110 periodically or whenever a change is made to the mappings of the look-up table, such that the latency predictor module 305 is able to access up-to-date mapping information when determining the bootstrap prediction.

In some embodiments, the latency predictor module 305 uses only the network connection type data to determine the bootstrap prediction. For example, in some embodiments a particular client device 110 may be expected to remain within a particular country (e.g., India). As such, the network predictor module 305 may not need to receive location information from the location module 114 or store mapping data relating to other countries, and instead simply accesses mapping data for the particular country.

In some embodiments, the latency predictor module 305 does not determine a bootstrap prediction. Instead, the latency predictor module 305 determines an initial latency value based upon one or more monitored network calls after the user has launched the application 112 on the client device 110.

Once the latency predictor module 305 has determined the bootstrap prediction (or an initial latency value based upon one or more monitored network calls), the latency predictor module 305 may update the bootstrap prediction based upon one or more monitored network calls. As used herein, a "network call" may correspond to any type of communication between the client device 110 and the application server 120 comprising a request transmitted from the client device 110 to the application server 120 followed by a response being transmitted from the application server 120 to the client device 110. The latency of the network call may be measured based upon an elapsed time between the transmission of the request by the client device 110 and the receipt of the response by the client device 110.

The time period in which it takes for a response to be received by the client device 110 following a transmitted request may comprise a network latency as well as a server latency of the application server 120. However, if the monitored network calls are all made by the same application 112 and directed to the same application server 120, then the server latency may be relatively constant, and will not contribute significantly to changes in network latency.

In some embodiments, the latency predictor module 305 monitors network calls by periodically identifying at least one canonical network call within a predetermined time interval. For example, in some embodiments, the latency predictor module 305 identifies a canonical network call for each interval of 4 seconds. A canonical network call may correspond to a network call that satisfies one or more predetermined characteristics. For example, a canonical network call may have a request that is under a certain size or is of a particular type (e.g., a type of request expected to be able to be processed by the application server 120 relatively quickly, thus reducing server latency). The latency predictor module 305 may maintain a whitelist listing the allowable types of requests for a canonical network call.

In some embodiments, the application 112 transmits a periodic status request to the application server 120. The periodic status request may be in the form of a canonical network call. The latency predictor module 305 may thus monitor the periodic status request transmitted by the application 112 in order to determine latency information.

In some embodiments, because the responses from the application server 120 of each network call may have different sizes, the latency of a network call may be measured based upon the time at which the first byte of the response is received. As such, variations in size of the responses can be accounted for when determining latency.

In some embodiments, the latency predictor module 305 predicts the expected latency amount for the client device 110 based upon a plurality of monitored network calls (e.g., the determined latency values of N previous network calls corresponding to N previous time periods). By using the determined latencies of network calls over a plurality of previous time periods, sudden shifts or one-off spikes/dips in latency can be accounted for, and prevented from unduly skewing the expected latency value.

The network classification module 116 stores the measured latency values for previous network calls in a buffer 310. As used herein, the measured latency values may hereinafter also be referred to as "samples." The buffer 310 is configured to store a plurality of samples corresponding to monitored network calls for a previous number (N) of most recent time periods. For example, the buffer 310 may comprise 5 entries for storing samples corresponding to the 5 most recent previous time periods of 4 seconds each. The buffer 310 is structured as a first-in first-out (FIFO) buffer, such that the first entry of the buffer 310 (e.g., sample[0]) always corresponds to a sample for a most recent time period, and so forth.

The latency predictor 305 retrieves the samples stored in the buffer 310 corresponding to a previous N monitored time periods, and aggregates the samples based upon one or more stored weight values 315 to determine the expected latency value for the client device 110. In some embodiments, the samples are aggregated using a weighted harmonic mean, as illustrated in Equation (1) below, where sample[t] corresponds to a sample stored in the buffer 310, and weight[t] is the corresponding weight value for the sample[t]:

$$\text{harmonic}_{avg} = 1 \div \left( \sum_{t \in T} \frac{\text{weight}[t]}{\text{sample}[t]} \right) \{T = N\} \quad (1)$$

In some embodiments, the weight value for the stored samples of the buffer 310 are configured such that more recent samples weighted more heavily in comparison to older samples. In other words, weight[0]>weight[1]> ... >weight[N−1]. This weighting may allow for the expected latency value to be reactive to current network conditions, while being insulated against outlier latency values (e.g., due to sudden spikes in network conditions).

The latency predictor module 305 determines the expected latency value, and classifies the expected latency value into a latency category (e.g., "magic", "fast", "medium", or "slow" as described above in relation to Table 1). In some embodiments, a current latency category may also be determined based upon a previously determined latency category. This may be done to prevent the latency category from rapidly switching between categories in cases where the expected latency value is near the boundary of two adjacent latency categories (e.g., near 0.5 seconds, which is the boundary between the "magic" and "fast" categories described above).

In some embodiments, each boundary between different latency categories may be associated with two different threshold values (e.g., a lower threshold and an upper threshold value). For example, for the boundary between the "magic" and "fast" categories described above, the lower threshold value may be 400 ms, while the upper threshold value is 600 ms. If the current expected latency value is between the lower and upper thresholds separating a first category (e.g., "magic") and a second category (e.g., "fast"), the latency category will remain the same as the previous latency category if the previous latency category is either the first or second category. Otherwise, the expected latency value is categorized based upon the boundary between the first and second latency categories (e.g., "magic" if <500 ms, or "fast" if between 500 ms and 1 s).

For example, if the previous latency category was "fast" and the expected latency value is 480 ms, then the current latency category may be determined to be "fast," even though the expected latency value is less than boundary between "magic" and "fast" (e.g., 500 ms) as illustrated in Table 1 above. This prevents relatively small changes in expected latency from causing rapid switching latency categories in response to small variations in expected latency values.

In some embodiments, the weights values 315 may be adjusted based upon a previously determined expected latency, a relationship between a previous expected latency and a most recently received latency value, or some combination thereof. For example, it is desirable for the expected latency to react more quickly to worsening network conditions (i.e., higher latency) in comparison to improving network conditions. As such, the weight values 315 used to calculate the expected latency may be different depending on whether the latency values of network calls are trending upwards (indicative of worsening network conditions) or downwards (indicative of improving network conditions). In some embodiments, the latency values are considered to be trending upwards if the latency value of a most recent sample (e.g., sample[0]) is greater than the previously calculated expected latency, and trending downwards if the latency value of the most recently received sample is less than the previous expected latency.

When the latency is trending upwards, more weight may be given to more recent samples. On the other hand, when latency is trending downwards, the weighting of samples may be more evenly distributed. For example, in some embodiments, the weight values 315 may comprise a first set of weights to be used when latency is determined to be trending upwards (inc_weight), and a second set of weights to be used when latency is trending downwards (dec_weight). In an embodiments, the first and second sets of weights may have the following values for a buffer 310 storing five samples: inc_weight=[0.38, 0.29, 0.2, 0.11, 0.02] and dec_weight=[0.34, 0.27, 0.2, 0.13, 0.06].

In some embodiments, instead of storing separate sets of weights, the weight values 315 may comprise one set of weights that are modified on the fly based upon whether latency is trending upwards or downwards. For example, the weight values for the samples stored in the buffer 310 may be determined based one or more modifiers corresponding to whether the latency is trending upwards for downwards. For example, in an embodiment, the weight values for a buffer have numSamples samples may be determined based upon equation (2) below:

factor=(numSamples−1)/2.0 for t in range(0, numSamples):

inc_weight[$t$]=(1.0/numSamples)+(factor−$t$)*
  inc_alpha dec_weight[$t$]=(1.0/numSamples)+(factor−$t$)*
  dec_alpha  (2)

The values of inc_alpha and dec_alpha may be configurable, wherein inc_alpha>dec_alpha. In an embodiment, inc_alpha has a value of 0.09, and dec_alpha has a value of 0.07. As illustrated in the equations (2) have, the value of each weight is dependent upon (factor−t), which will be larger for more recent samples. Because inc_alpha is configured to be larger than dec_alpha, the value of the weights for more recent samples will be larger when latency is trending upwards in comparison to when latency is trending downwards. On the other hand, weights for older samples (e.g., larger values of t where t>factor) will be smaller when latency is trending upwards in comparison to downwards.

As discussed above, each sample of buffer 310 is configured to store a determined latency value of a monitored network call (e.g., a status request) that was made during a predetermined time period (e.g., 4 second intervals). However, in some cases when network latency is high, a monitored network call may not receive a response within the predetermined time period (e.g., within 4 seconds). If the expected latency value needs to wait for the completion of the network call, then a network call that does not complete with the predetermined time period may cause delays in the calculation of expected latencies, and prevent the latency category from being able to react to deteriorating network conditions.

In order to prevent such delays, the latency predictor module 305 starts a periodic timer when a monitored network call is initiated. The periodic timer is set to a value matching that of the predetermined time period (e.g., 4 seconds). If the latency of the network call exceeds the predetermined time period, the periodic timer fires and records the value of the timer as a sample into the buffer 310. For example, if a particular monitored network call has a latency of 10 seconds, the periodic timer will cause a value of 4 seconds to be recorded in the buffer 310 after a first time interval, which can be used to calculate an expected latency value. The value is then updated to 8 seconds after a second time interval, and used to calculate a new expected latency value. The value in the buffer 310 may then be updated to the latency of the completed network call (10 seconds) after a third time interval. As such, the latency predictor 305 does not need to wait for the monitored network call to complete before being able to calculate updated expected latency values that reflect high amounts of latency in the network.

In some embodiments, instead of updating the value of the network call in the buffer 310 each sampling interval, a network call that has not completed within the sampling interval (e.g., 4 seconds) may be divided into a plurality of samples to be recorded in the buffer, resulting in multiple latency values recorded in the buffer 310. For example, returning to the above example of a monitored network call having a latency of 10 seconds and where the sample interval of measuring network call latency is 4 second, after a first interval of 4 seconds during which the network call has not completed, a value of 4 seconds is recorded in the buffer, allowing for an updated expected latency to be determined. After a second interval during which the network call has still not completed, a second value of 4 second is recorded as a new sample on the buffer (such that both the most recent and second most recent sample in the buffer 310 will have a value of 4 seconds), such that the expected latency can be updated based upon recorded values for the both the first and second intervals. After a third interval during which the network call completes, a third value is recorded as a new sample on the buffer. In some embodiments, the third value may correspond to the remaining portion of the latency of the network call that overlaps with the third interval (e.g., 2 seconds). In other embodiments, the third value may correspond to the length of the sampling interval (e.g., 4 seconds), a total amount of latency of the network call (e.g., 10 seconds), or a value between the length of the sampling interval and the latency of the network call (e.g., a value between 4 and 10 seconds). This may be done in order to avoid the situation where a network call having a latency spanning multiple sampling intervals but ending with only a small amount of overlap with a last sampling interval from causing a lower expected latency value to be determined even though there was no improvement in latency. In some embodiments, instead of recording values corresponding to the length of the sampling interval during intervals in which the network call has not yet completed, the total current latency at the end of each interval may be recorded as new samples on the buffer (e.g., 4 seconds, 8 seconds, etc.). However, this may reduce a speed at which the network classification module is able to transition from a high latency category to a low latency category when the latency of the network latency recovers.

By breaking up a long-standing network call into multiple values and recording each value as a new sample in the buffer, the network classification module is able to more quickly react to worsening network conditions by changing the expected latency from a lower latency category to a higher latency category, as latency values corresponding to previous network calls will continue to be aged out of the buffer each sampling interval.

In addition, the total latency of the network call when spread out over different samples in the buffer. As additional values are added to the buffer, each sample value will have a different weight when predicting the expected latency value of the network connection. Once network conditions improve, the network classification module may be able transition more quickly from a high latency category to a low latency category, compared to if the entire latency of the network call were contained within a single buffer value.

Figure 4:
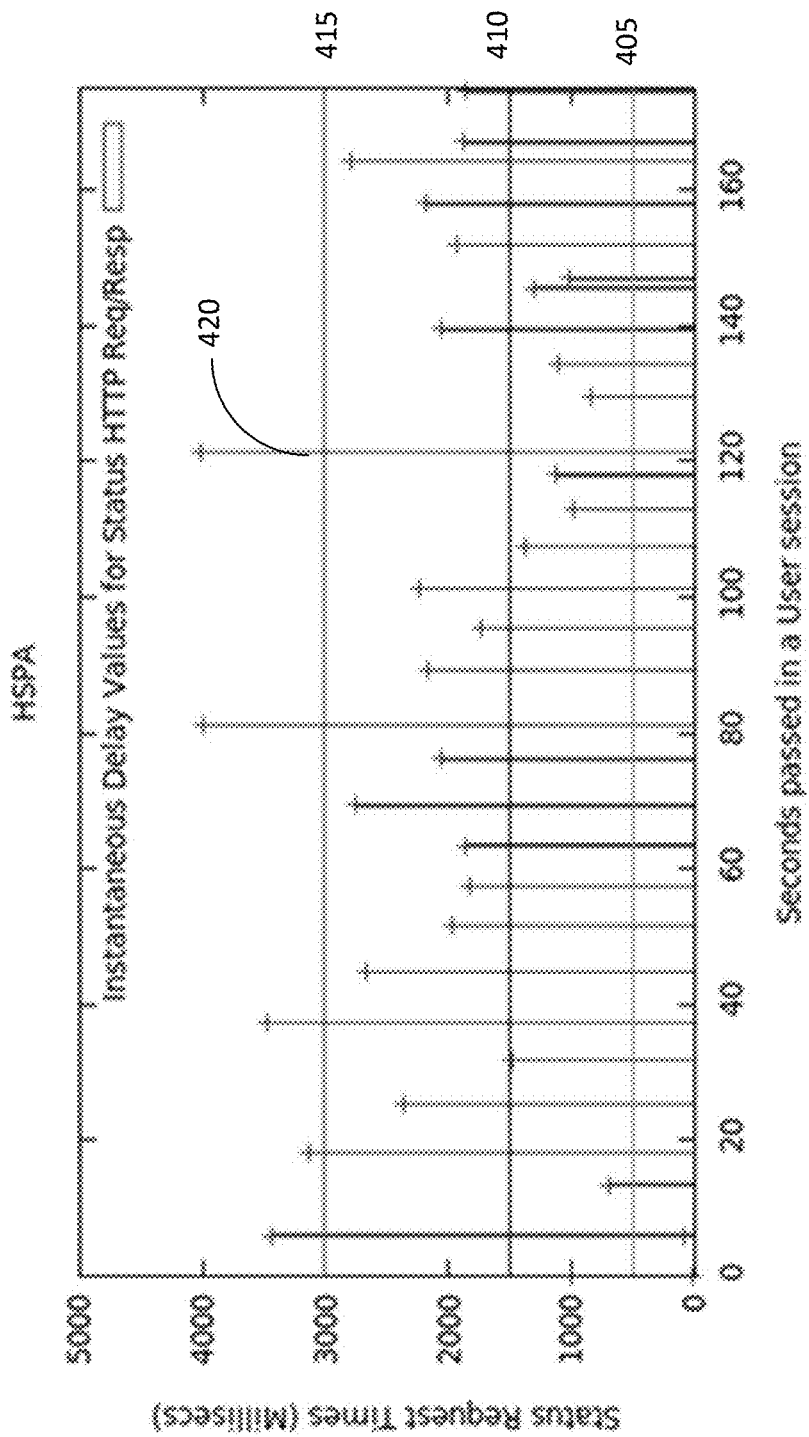
FIG. 4 is a graph illustrating network latency measurements that may be received over time, in accordance with some embodiments.

FIG. 4 is a graph illustrating network latency measurements that may be received over time, in accordance with some embodiments. The graph 400 comprises an X-axis corresponding to time during a user session measured in seconds, and a Y-axis corresponding to the measured network latencies of monitored network calls, measured in milliseconds. In addition, the graph 400 illustrates a first threshold level 405, second threshold level 410, and third threshold level 415 corresponding to boundaries between different network latency categories. For example, the first threshold level 405 may correspond to a boundary between "magic" and "fast", the second threshold level 410 may correspond to a boundary between "fast" and "medium", and the third threshold level 415 may correspond to a boundary between "medium" and "slow." The vertical bars 420 illustrates individual latencies values determined for monitored network calls, which may occur on a periodic basis.

As illustrated in the graph 400, the measured latency values of individual network calls may vary over a wide range, and may suddenly spike or dip in comparison to the latencies other network calls issued during adjacent time periods. As such, if the network classification module 116 determined a network latency category based on individual network calls, the determined network latency category may change rapidly as latency values for new monitored network calls are received. Instead, by aggregating multiple latency measurements over time, impact from rapid changes in latency and one-off spikes are less likely to cause sudden changes in classification of the expected latency value.

In some embodiments, performance of the network classification module 116 may be measured based upon an efficiency metric and a stability metric. The "efficiency" of the network classification module 116 may be measured based upon an aggregated difference between the measured latency values of individual monitored network calls and the expected latency levels determined by the latency predictor module 305. In some embodiments, the efficiency of the network classification module is determined and maintained over a single user session.

For example, where W corresponds to the total samples in a user session and L corresponds to the total number of latency categories, let $L_I$ be the latency category corresponding to the measured latency of an individual sample w+1 (e.g., corresponding to an individual network call measured during a single time interval), and $L_A$ be the latency category selected based on the expected latency values at sample w, the expected latency calculated based upon a aggregation of the measured latencies of N previously monitored network calls as discussed above. The efficiency metric may be normalized to be comparable across different users and sessions. The efficiency E for a given user session may be defined based on Equation (3) below.

$$E = 1 - \left\{ \sum_W |L_I - L_A| \div (W \times (L-1)) \right\} \quad (3)$$

If $L_I$ and $L_A$ have similar values, indicating that the expected latency determined by the latency predictor module 305 is close to the measured latency of a subsequent monitored network call, the value of E will be close to 1. A value of E closer to 1 indicates a more efficient network classification module 116 (e.g., that the determined expected latency values more accurately match the actual measured latency values of subsequent samples), while a value of E closer to 0 indicates a less efficient network classification module 116.

Stability of the network classification module 116 may be measured using a metric that indicates the aggregate fluctuations in the selected latency categories across a single user session. Defining $S_I$ as a binary variable with a value of 1 if there is a switch in latency category and 0 if there is no switch in latency category of an individual sample w relative to a previous sample (e.g., sample w−1), and $S_A$ as a binary variable based upon whether there is a switch in the latency category of the expected latency value calculated based on a most recent sample w (e.g., 1 if there is a switch, and 0 if there is no switch) relative to a previously calculated expected latency value. Stability metrics $St_I$ and $St_A$ are individually defined in equations (4) below, and a unified stability metric St defined as their ratio (with an added 1 in the denominator to avoid 0/0 divisions), as indicated in equation (5).

$$St_A = \sum_W S_A \div W, St_I = \sum_W S_I \div W \quad (4)$$

$$St = St_A \div (St_I + 1) \quad (5)$$

The value of St being close to 0 indicates that the network classification module 116 is stable (e.g., the latency category corresponding to the calculated expected latency value switches less often than the latency category of individual samples), while an St value closer to 1 indicates instability of the network classification module 116.

In some embodiments, the latency predictor module 305 maintains logs that tracks the values of $L_i$, $L_a$, $S_i$, $S_a$ as additional samples are received. On the other hand, the efficiency metric E and stability metric St may be calculated at the end of a user session based upon the recorded log values. In some embodiments, once efficiency and stability metrics have determined for a plurality of users over a plurality of sessions, a single metric corresponding to a linear combination of the two metrics may be determined, and used to identify and analyze user sessions for which the metrics are not as good as expected (e.g., less efficient or stable than expected).

Figure 5:
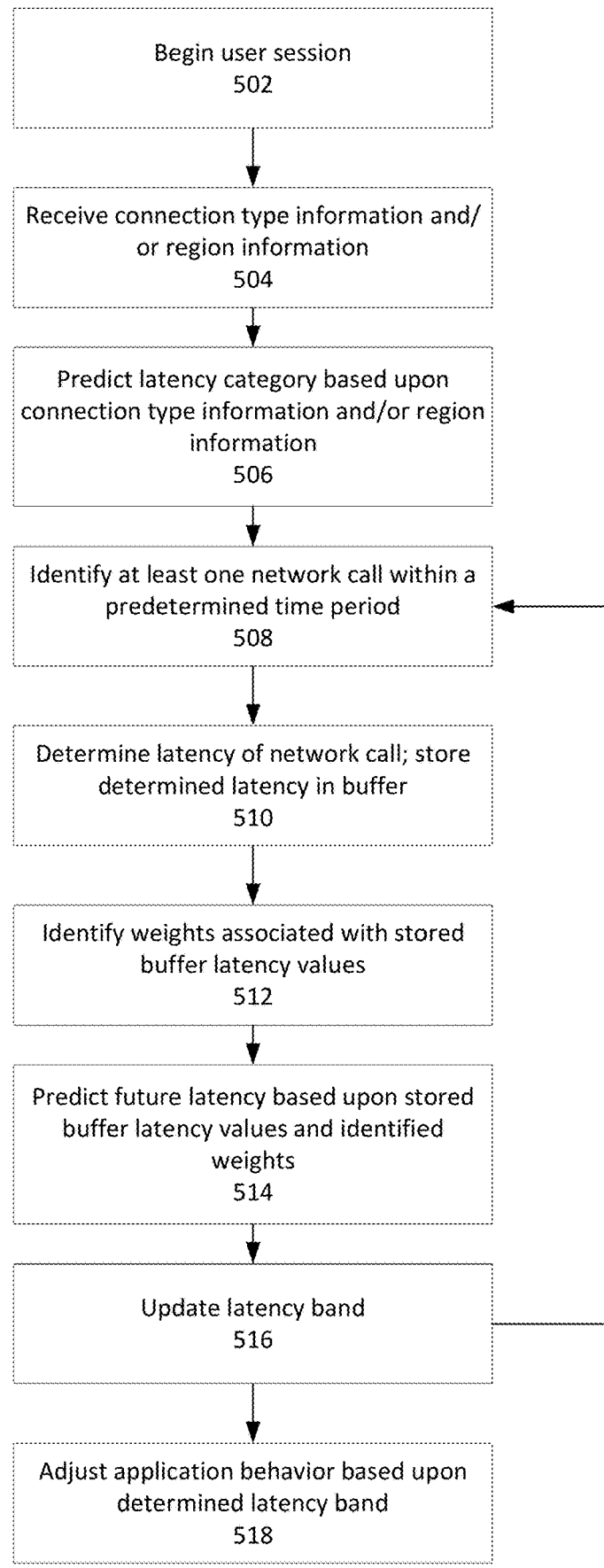
FIG. 5 is flowchart of a process for determining a latency classification for a network connection, in accordance with some embodiments.

FIG. 5 is flowchart of a process for determining a latency classification for a network connection, in accordance with some embodiments. At 502, the user of the client device 110 begins a user session. In some embodiments, the user begins a user session by switching on the client device 110, establishing a network connection on the client device 110, and/or launching the application 112 on the client device 110.

When a user session begins, the network classification module 116 may first generate an initial bootstrap prediction indicating an expected level of latency of a network connection of the client device 110 for accessing the application server 120. At block 504, the network classification module 116 receives connection type information (e.g., from an OS of the client device 110) and/or location information of the client device 110 (e.g., from a location module 114). At block 506, the network classification module 116 uses the received connection type info and/or location info to determine a latency category for the client device 110. In some embodiments, the network classification module 116 accesses a mapping table that maps combinations of network connection types and geographic regions to different latency categories, such as Table 1 above.

After determining the initial bootstrap prediction, the network classification module 116, at block 508, periodically monitors network calls made by the client device 110, in order to update the bootstrap prediction and provide up to date information on the latency of the network connection. In some embodiments, the network classification module 116 identifies at least one network call made by the client device 110 within each predetermined time interval. The identified network call may correspond to a canonical network call having one or more predetermined characteristics. In some embodiments, the identified network call may correspond to a periodically transmitted status request network call, whereupon the predetermined time interval may correspond to the interval of time between each transmitted status request.

At block 510, the network classification module 116 measures and stores a latency of each of the monitored network calls in buffer. In some embodiments, the latency of a monitored network call may correspond to a length of time from which the request of the network call is transmitted by the client device 110 to when a first byte of a response from the application server 120 is received. The buffer is configured to stored measured latency values ("samples") from a plurality of previous time periods. For example, in some embodiments, the buffer stores five samples corresponding to the latencies of five network calls corresponding to a most recent five time intervals.

At block 512, the network classification module 116 identifies a set of weights associated with the stored buffer samples for calculating an expected latency. In some embodiments, the weights are configured that more recent samples are associated with larger weight values in comparison to less recently received samples. In some embodiments, the set of weights may be based upon a comparison between the latency of a most recent sample and a previously determined expected latency, indicating whether network latency is trending upwards or downwards. For example, more recently received samples may be weighted more heavily when network latency is determined to be trending upwards in comparison to downwards.

At block 514, the network classification module 116 aggregates the stored buffer samples based upon the set of weights, to determine an expected latency value. The expected latency value may correspond to an amount of latency expected to be experienced by one or more future network calls. In some embodiments, the expected latency value is calculated as a weighted harmonic mean of the stored buffer samples. At block 516, the network classification module 116 determines a network latency category based upon the determined expected latency value. The process may then return to block 508, where the network classification module 116 continues to monitor periodic network calls to determine an up-to-date expected latency and update the network latency category.

In addition, at block 518, the network classification module 116 may transmit the determined network latency category to the application 112, causing the application 112 to modify operations of one or more modules based upon the received network latency category (e.g., implement a particular behavior policy based upon the network latency category). For example, as discussed above, the application 112 may be configured to provide suggested results in response to a received portion of a query, whereupon the application 112 identifies the suggested results from a local results cache or from a results store on the application server 120 based upon the determined network latency category. In some embodiments, the application 112 may modify how it issues time-out alerts based upon the determined network latency category.

Figure 6:
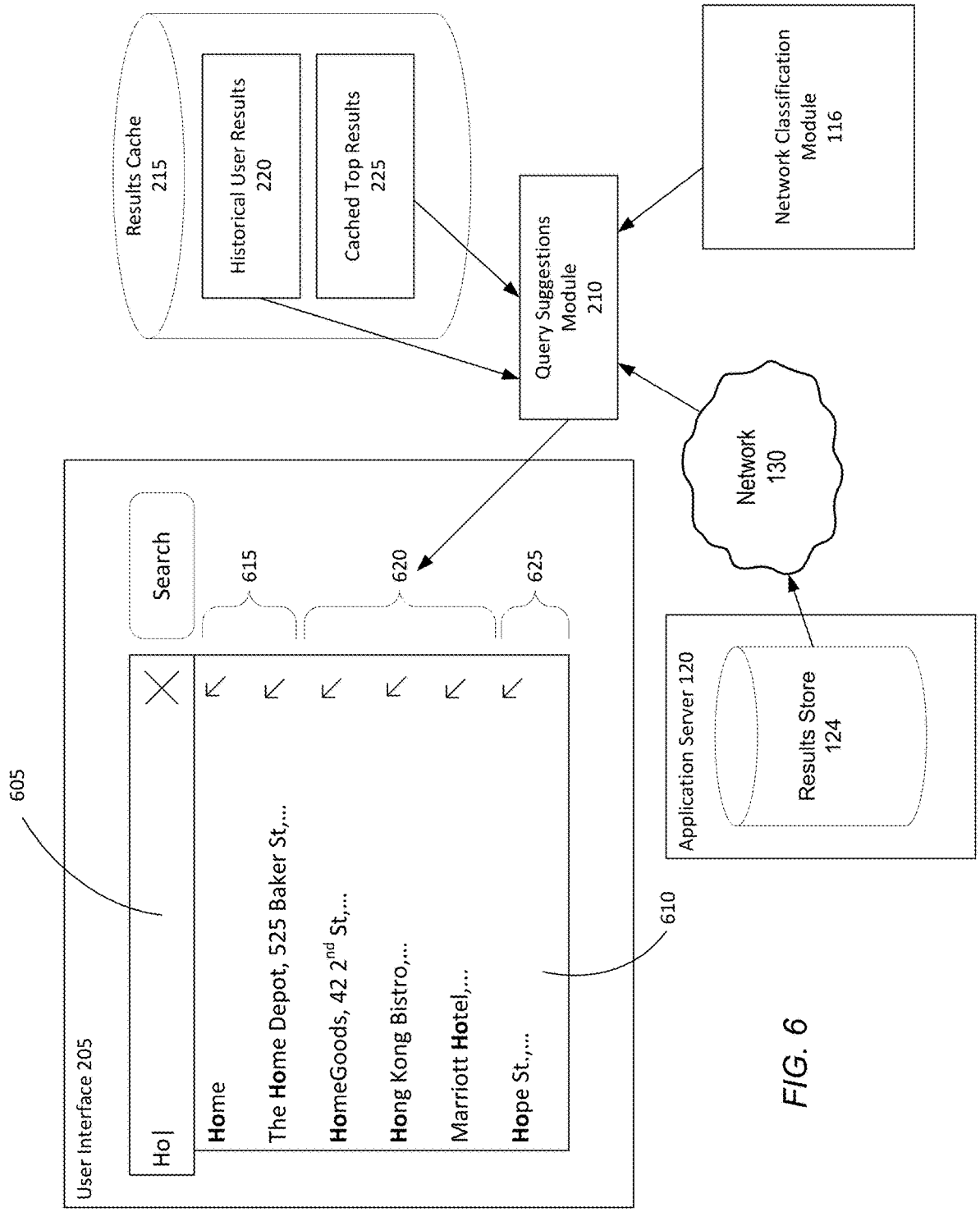
FIG. 6 illustrates a diagram of providing search result suggestions in response to a user query based upon network latency classification, in accordance with some embodiments.

FIG. 6 illustrates a diagram of providing search result suggestions in response to a user query based upon network latency classification, in accordance with some embodiments. The application 112 may display to the user of the client device 110 a user interface 205 containing one or more interactive user interface elements. For example, the user interface 205 may comprise an input field 605 usable by the user to input a query or a portion of a query to search for locations, products, and the like. For example, as illustrated in FIG. 6, the user has entered the string "Ho" into the input field 605, which corresponds to a portion of a query to search for a location.

As the user inputs the query into the input field 605, the application may, in substantially real time, provide a list 610 of suggested results to be displayed to the user (e.g., under the input field 605) based upon the received query portion that has been input in the input field 605. For example, in response to the currently received user input "Ho" in the input field 605, the list 610 of suggested results may include "Home", "The Home Depot", "Marriott Hotel", and the like, which correspond to location results determined by the query suggestions module 210 to be likely to correspond to a location that the user is searching for.

The list 610 of suggested results may include a first set of results 615 corresponding to results previously queried by the user, a second set of results 620 corresponding to locally cached top results, and a third set of results 625 corresponding to top results received from the application server 120. The query suggestions module 210 may access the locally stored results cache 215 and the results store 124 on the application server 120 (via the network 13) in order to identify potential results to be provided as suggestions in the list 610.

The first set of results 615 correspond to results previously queried by the user. For example, when the user selects a particular result (e.g., "Home") in response to a previously input query, the selected result may be stored in the results cache 215 as part of the historical user results 220. In some embodiments, the historical user results 220 may comprise up to a predetermined number of historical results, all historical results queried by the user within a particular time period, within one or more particular geographic regions, and the like.

The second set of results 620 correspond to locally cached top results, and may be stored in the results cache 215 as part of the cached top results 225. The cached top results 225 may correspond to a set of most frequently searched for results by a plurality of users across a plurality of client devices. In some embodiments, the cached top results 225 are restricted to results within a particular geographic area (e.g., a geographic area corresponding to a location associated with the user of the client device 110). In some embodiments, the application 112 periodically accesses the application server 120 to retrieve an updated set of cached top results 225.

The third set of results 625 correspond to results received from the application server 120 (e.g., from the results store 124). In some embodiments, the application server 120 tracks search results selected by a plurality of users of a plurality of client devices, and stores the results in the results store 124. The application server 120 may further categorize and sort the results based on one or more categories (e.g., by frequency of search, geographic region, etc.). The query suggestions module 210, in response to receiving a portion of a query input by the user, may transmit the received portion to application server 120, which identifies one or more results from the results store 124 to be returned as suggested results, and transmits the suggested results to the query suggestions module 210.

In some embodiments, the query suggestions module 210 always accesses the historical user results 220 for potential suggested results. For example, where the application 112 is configured to allow the user to query for locations and request transportation to or from the queried locations, the user may be expected to query the same locations more than once at different times. As such, the historical user results 220 may always be considered to be relevant for providing as suggested results. Furthermore, because the historical user results 220 may be stored locally on the client device 110, identifying suggested results from the historical user results 220 is not affected by the network latency category of the network connection. In some embodiments, the query suggestions module 210 is configured to retrieve up to a predetermined number of potential results from the historical user results 220, all potential results having a aggregated score (described in greater detail below) exceeding a threshold value, or some combination thereof.

On the other hand, whether the query suggestions module 210 obtains suggested results from the cached top results 225 or the results store 124 on the application server 120 may change based upon the network latency category of the network connection (as determined by the network classification module 116). As the results stored in the cached top results 225 typically corresponds to only a subset of the results stored in the results store 124 retrieved periodically, more relevant and up-to-date suggested results can typically be obtained from the results store 124 in comparison to the cached top results 225. However, if the latency of the network connection is high, results from the results store 124 may not be able to be retrieved from the application server 120 quickly enough to be useful to the user. For example, as the user continues to input the query at the input field 605, retrieved suggested results from the application server 120 may no longer be relevant.

As such, the query suggestions module 210 may, in addition to requesting results from the results store 124 on the application server 120, may retrieve results from the cached top results 225 if the network latency is high. For example, in some embodiments, if the network latency category is "magic" or "fast," then the query suggestions module 210 may request suggested results from the application server 120, and not retrieve any results from the cached top results 225. On the other hand, if the network latency category is "slow" or "medium," then the query suggestions module 210 may retrieve results from the cached top results 225 as well as from the application server 120, in order to ensure that at least some results can be displayed to the user in a timely manner (e.g., within a threshold period of time). In some embodiments, for certain network latency categories, the query suggestions module 210 may retrieve results from the cached top results 225 and not from the application server 120. In some embodiments, each network latency category may be mapped to a different set of behaviors for the query suggestions module 210. For example, the number of results retrieved from cache may vary based upon the network latency category.

In some embodiments, the query suggestions module 210, in response to receiving a plurality of potential results from the historical user results 220, cached top results 225, and/or the results store 124, sorts the received results to determine which results to provide to the user in the list 610 as suggested results, and in which order. In some embodiments, results from the historical user results 220 may always be displayed at the top of the list 610, while the remaining results are sorted separately. In other embodiments, all received results are sorted together.

In some embodiments, each potential result is associated with one or more scores. For example, where the potential results correspond to locations, each potential result is associated with a "match index score", a "popularity score", and a "distance score." It is understood that in other embodiments, the potential results may be associated with different combinations of scores. In some embodiments, an aggregated "suggestions score" is determined for each of a plurality of potential results, in order to rank the potential results to be provided as suggestions to the user in the list 610.

The "match index score" indicates a level of similarity between the text of the received query portion and the potential result. In some embodiments, if the query portion comprises multiple words, the query portion is tokenized and each individual token (e.g., word) is matched one after another against the potential results. The match index score may be based upon a position (e.g., index) of a word within the potential result matching a particular word of the query portion (e.g., the first word). For example, if the query portion is "Airport SF," then the potential result "Airport parking" may have a higher match score in comparison to "San Francisco Airport," due to the first word of the query portion ("Airport") appearing earlier in the potential result.

In some embodiments, the match index score is calculated based on a function inversely proportional to the index of the first occurrence within the potential result matching the particular word of the query portion. For example, the match index score may be determined based upon the function f(index)=mCharacterWeight/(mCharacterWeight+index), where index corresponds to the index of the first occurrence in the potential result matching the first word of the query portion, and mCharacterWeight is a predetermined constant value. As such, the match index score may be between 1 (highest) and 0 (lowest) and calculated as an exponentially decreasing function of the index (where a smaller index indicates that a match for the word of the query portion appears earlier in the potential result). In some embodiments, the value of the mCharacterWeight constant may be selected based upon a desired index value that will yield a score of 0.5.

The "popularity score" indicates a relative level of popularity of a particular potential result. In some embodiments, the popularity is based upon a frequency at which the results satisfied previous queries from users of the application 112, a frequency at which the location of the result was travelled to by users of the application 112, a frequency at which a product corresponding to the result was purchased by users of the application 112, and the like. In some embodiments, the popularity score of a potential result is boosted a percentage based upon the match index score described above. For example, in some embodiments, the popularity score popularityValue is calculated as popularityValue=popularityValue+popularityValue*popularityBoosterWt*matchIndexScore. The popularity booster weight may correspond to a percentage by which the match index score can boost the popularity score (e.g., up to 15%). In some embodiments, the popularity score is weighted using a function f(popularityValue)=popularityValue/(popularityValue+popularityWt), where popularityValue is a value indicative of a frequency associated with the potential result (e.g., number of queries satisfied, number of times travelled to, etc.), and popularityWt corresponds to a predetermined constant value. As such, the popularity score may map frequency values x to a score between 0 and 1, with a slope that reduces as the value of x increases. In some embodiments, for potential results retrieved from the application server 120, the application server 120 may determine the popularity score for each of the retrieved results. In some embodiments, the application server may include additional metrics in determining the popularity score for a potential result.

The "distance score" indicates a distance between a location associated with a potential result and a current location of the client device 110. In some embodiments, the distance score is based on an inverse of the distance between the potential result and the client device 110, such that potential results corresponding to locations closer in distance to the client device will be score more highly. In some embodiments, the distance score is weighted using a function f(distance)=distanceWt/(distance+distanceWt), where distanceWt corresponds to a predetermined constant value.

In some embodiments, the total "suggestion score" for a particular result is based upon an aggregation of the distance score and the popularity score (boosted based upon the match index score). In some embodiments, by using the match index score to boost popularity score instead of being a separate score aggregated as part of the suggestion score, it may allow for more popular results to be suggested, even if they do not match the user query as well. For example, it may be more desirable to suggest "San Francisco International Airport (SFO)" as a suggested result to the query "sfo", instead of "SFO Long Term Parking," if the first result is significantly more popular than the second result, despite having a lower match index score. In other embodiments, the total "suggestion score" may comprise a weighted aggregation of the match index score, distance score, and/or popularity score of the result.

In some embodiments, a "suggestion score" is determined for each one or more historical user results. In some embodiments, at least some of the historical user results may not associated with a popularity score (e.g., due to not having sufficient popularity to be a part of the cached top results 225). Instead, the "suggestion score" for a historical user result may be based upon the match index score of the result, or an aggregation of the match index score and distance score, etc. In other embodiments, the "suggestion score" for a historical user result not associated with a popularity score may be calculated as described above, using a popularity score of 0. In some embodiments, historical user results not having popularity scores may be compared based upon their respective match index scores to determine which result is more relevant.

In some embodiments, the query suggestions module 210 retrieves potential results from the historical user results 220, and, depending on the network latency category, from the cached top results 225 and/or results store 124, having a suggestion score exceeding a threshold value. When sorting potential results, the query suggestions module 210 may prioritize historical user results, such that they are always stored first on the list 610. The remaining potential results may then be sorted based upon their respective suggestion scores. For example, in some embodiments, the query suggestions module 210 may store on the list 610 a top n historical user results (e.g., based upon suggestion scores associated with the historical user results), or all historical user results having a suggestion score above a threshold value, and/or the like, before including results of the remaining potential results (e.g., sorted by respective suggestion scores).

Figure 7:
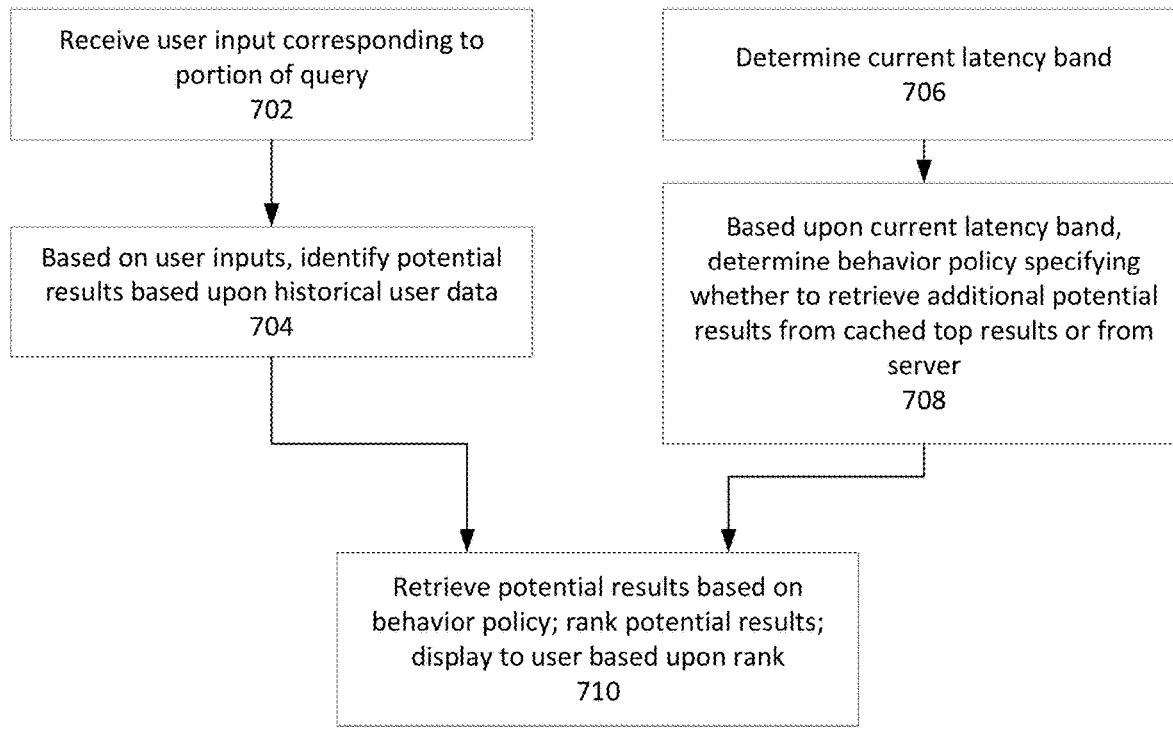
FIG. 7 is flowchart of a process for providing search result suggestions in response to a user query based upon a network latency classification, in accordance with some embodiments.

FIG. 7 is flowchart of a process for providing search result suggestions in response to a user query based upon a network latency classification, in accordance with some embodiments. At block 702, the application 112 receives, via a user interface, user input corresponding to portion of query. At block 704, the application 112, based on received input, accesses historical user results corresponding to results previously selected by the user, in order to identify one or more potential results. In some embodiments, the application 112 determines a score for each of a plurality of the historical user results, and selects one or more of the historical user results having the highest scores as potential results to be suggested to the user.

At block 706, the application 112 determines a current level of network latency. For example, in some embodiments, the application 112 receives a network latency category from the network classification module 116.

At block 708, the application 112, based on determined latency information, determines a behavior policy specifying whether to retrieve potential results from a local cache or request additional potential results for the application server 120. For example, if the determined latency of the network connection is greater than a threshold level (e.g., high latency), the application 112 may select a behavior policy that retrieves results from the local cache. On the other hand, if the determined latency is less than a threshold value (e.g., low latency), the behavior policy may indicate that results are only requested from the application server 120, and not from the local cache. In some embodiments, the behavior policy may indicate that results are to retrieved from the local cache as well as requested from the application server 120. Determination of the current level of network latency and corresponding behavior policy may be performed periodically, and may occur in parallel with or independently from the receipt of user queries (e.g., as described in relation to blocks 702 and 704).

At block 710, the application 112 retrieves potential results based upon the determined behavior policy, sorts the received results, and displays at least a subset of the results to the user at the user interface as suggested results. This allows for the user to select a desired result corresponding to their query.

As such, using the techniques described above, the latency of a network connection between a client device and application server can be measured and categorized in a way that a way that accurately reflects an expected future latency of the connection while avoiding being unduly influenced by sudden spikes or dips from one-off network calls. The network latency categorization may then be used to adjust the behavior of the application. For example, the application may determine whether to retrieve data from a remote server or a local cache based upon the network latency classification, in order to balance quality of provided data with speed at which the data can be provided, thus improving user experience when using the application.

Figure 8:
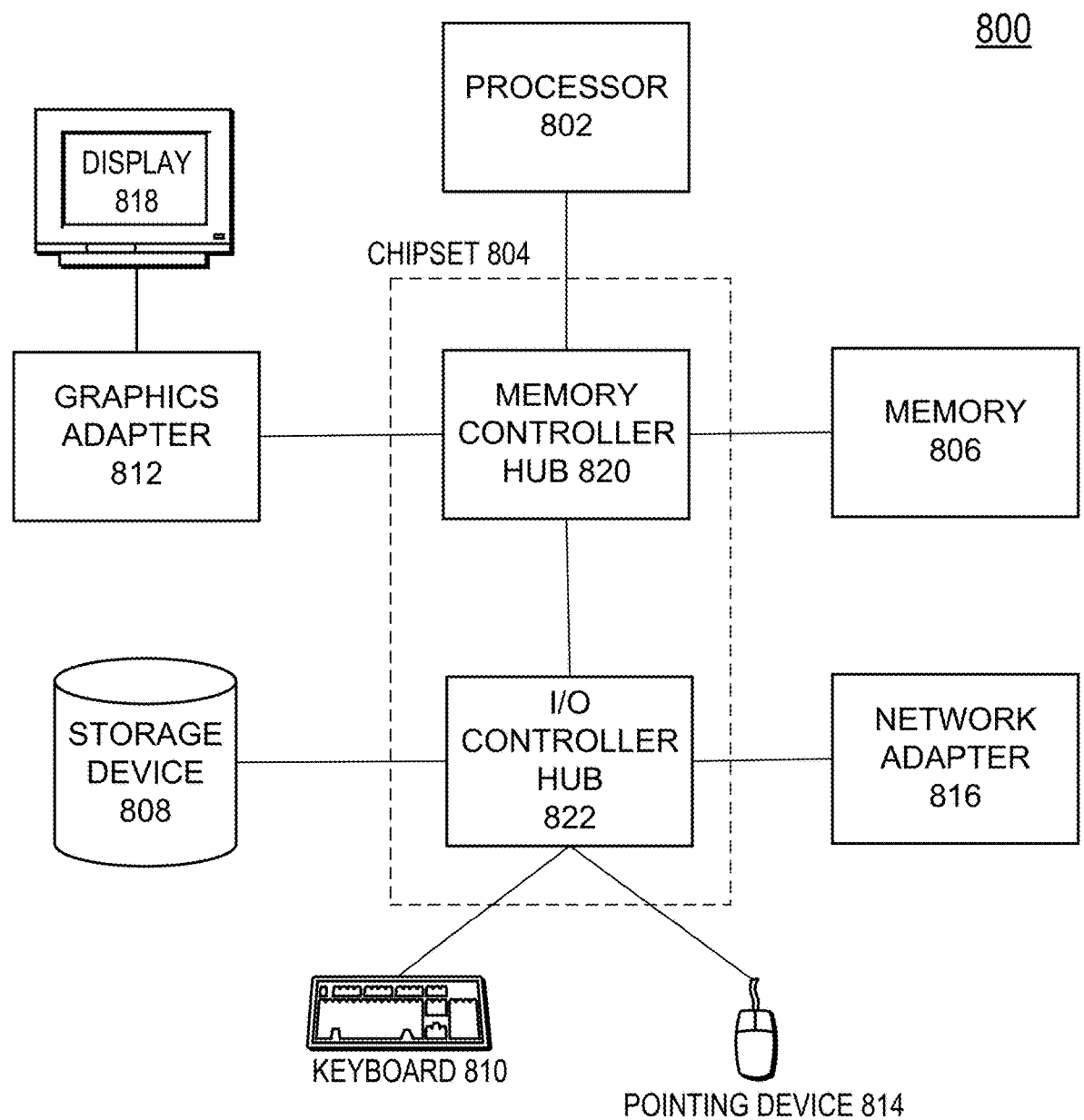
FIG. 8 is a block diagram illustrating components of an example machine able to read instructions from a machine-readable medium and execute them in one or more processors.

FIG. 8 is a block diagram illustrating physical components of a computer 800 used as part or all of the network system 130, user client device 100, or provider client device 110 from FIG. 1, in accordance with an embodiment. Illustrated are at least one processor 802 coupled to a chipset 804. Also coupled to the chipset 804 are a memory 806, a storage device 808, a graphics adapter 812, and a network adapter 816. A display 818 is coupled to the graphics adapter 812. In one embodiment, the functionality of the chipset 804 is provided by a memory controller hub 420 and an I/O controller hub 422. In another embodiment, the memory 806 is coupled directly to the processor 802 instead of the chipset 804.

The storage device 808 is any non-transitory computer-readable storage medium, such as a hard drive, compact disk read-only memory (CD-ROM), DVD, or a solid-state memory device. The memory 806 holds instructions and data used by the processor 802. The graphics adapter 812 displays images and other information on the display 818. The network adapter 816 couples the computer 800 to a local or wide area network.

As is known in the art, a computer 800 can have different and/or other components than those shown in FIG. 4. In addition, the computer 800 can lack certain illustrated components. In one embodiment, a computer 800, such as a host or smartphone, may lack a graphics adapter 812, and/or display 818, as well as a keyboard 810 or external pointing device 814. Moreover, the storage device 808 can be local and/or remote from the computer 800 (such as embodied within a storage area network (SAN)).

As is known in the art, the computer 800 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 808, loaded into the memory 806, and executed by the processor 802.

The foregoing description described one embodiment of the invention in which the user client device 100 determines an initial latency prediction based upon a geographic location and connection type, and, based upon a plurality of measured latency values from periodic canonical network calls over a network 130, updates the latency prediction to reflect a future expected amount of latency. The determined latency category may be used by the user client device 100 to determine behavior when providing search result suggestions (e.g., whether to retrieve the suggestions from a remote server, or from a local results store), which are sorted for display based upon past activity of the user, overall popularity among a plurality of users, match quality with a query portion, location relative to the user, etc.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations while described functionally computationally or logically are understood to be implemented by computer programs or equivalent electrical circuits, microcode, or the like. Furthermore, it has also proven convenient at times to refer to these arrangements of operations as modules without loss of generality. The described operations and their associated modules may be embodied in software, firmware, hardware, or any combinations thereof.

Any of the steps operations or processes described herein may be performed or implemented with one or more hardware or software modules alone or in combination with other devices. In one embodiment a software module is implemented with a computer program product comprising a computer-readable medium containing computer program code which can be executed by a computer processor for performing any or all of the steps operations or processes described.

Embodiments may also relate to an apparatus for performing the operations herein. This apparatus may be specially constructed for the required purposes and/or it may comprise a general-purpose computing device selectively activated or reconfigured by a computer program stored in the computer. Such a computer program may be stored in a nontransitory tangible computer readable storage medium or any type of media suitable for storing electronic instructions which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process where the information is stored on a non-transitory tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description but rather by any claims that issue on an application based hereon. Accordingly, the disclosure of the embodiments of the invention is intended to be illustrative but not limiting of the scope of the invention which is set forth in the following claims.

What is claimed is:

1. A method, comprising:
    receiving, via a user interlace of an application of a mobile device, input from a user corresponding to at least a portion of a query;
    on the mobile device, retrieving from a results cache one or more results from a first set of stored results corresponding to results of previous queries received from the user, based upon the received query portion;
    identifying a level of network latency associated with a current connection of the mobile device to a server by, for each of a plurality of time periods:
        identifying a network call to the server performed by the mobile device over the current connection during the period of time;
        determining whether the network call completed during the period of time;
        responsive to the network call completing during the period of time, determining an amount of latency of the network call, and adding the determined latency to a network latency buffer, the network latency buffer configured to store determined latency amounts corresponding to network calls performed during a plurality of previous periods of time;
        responsive to the network call not completing during the period of time, adding to the network latency buffer a latency value based upon a total length of the period of time;
    identifying a set of weights corresponding to each of the determined latency amounts stored by the network latency buffer, the set of weights based upon at least one previously predicted network latency;
    predicting an expected amount of network latency, based upon the determined latency amounts stored by the network latency buffer and the corresponding identified set of weights;
    updating the network latency category based upon the predicted expected network latency and at least one previously predicted network latency; and retrieving one or more additional results by:
        based upon the identified level of network latency, determining whether to retrieve at least a portion of the one or more additional results from a second set of results stored by the results cache responsive to the received query portion, the second set of results corresponding to historical results previously retrieved from a server.

2. The method of claim 1, wherein retrieving the one or more additional results further comprises, based upon the identified level of network latency, determining whether to retrieve at least a portion of the one or more additional results from the server responsive to the received query portion.

3. The method of claim 1, wherein the results correspond to geographic locations.

4. The method of claim 1, wherein the level of network latency corresponds to one of a plurality of network latency categories, each network latency category indicating a predetermined range of network latency values.

5. The method of claim 4, wherein the plurality of network latency categories comprises at least a first category and a second category, the second category indicating a lower level of network latency in comparison to the first category, wherein:
    responsive to the level of network latency corresponding to the first category, retrieving one or more results from the second set of results stored by the results cache responsive to the received query portion, and one or more additional results from the server responsive to the received query portion; and
    responsive to the level of network latency corresponding to the second category, retrieving the additional results from the server responsive to the received query portion, and not retrieving one or more results from the second set of results stored by the results cache responsive to the received query portion.

6. The method of claim 1, wherein identifying the level of network latency further comprises estimating an initial network latency category for a mobile device, the network latency category indicating an amount of network latency of a connection to a server established by the mobile device.

7. The method of claim 1, wherein the network latency buffer is a first-in first-out buffer.

8. The method of claim 1, wherein the second set of results are retrieved from the server periodically.

9. The method of claim 8, wherein retrieving the second set of results comprises: responsive to a determination that the user is not currently actively using the application and that the network connection of the mobile device is of a particular type, initiating download of the second set of results from the server; and
    responsive to a determination that the user has started actively using the application or that the network connection of the mobile device has changed to a different type during the download, suspending download of the second set of results from the server.

10. A method, comprising:
    estimating an initial network latency category for a mobile device, the network latency category indicating an amount of network latency of a connection to a server established by the mobile device;
    updating the network latency category by, for each of a plurality of time periods:
        identifying a network call to the server performed by the mobile device over the current connection during the period of time;
        determining whether the network call completed during the period of time;
        responsive to the network call completing during the period of time, determining an amount of latency of the network call, and adding the determined latency to a network latency buffer, the network latency buffer configured to store determined latency amounts corresponding to network calls performed during a plurality of previous periods of time;

responsive to the network call not completing during the period of time, adding to the network latency buffer a latency value based upon a total length of the period of time;

identifying a set of weights corresponding to each of the determined latency amounts stored by the network latency buffer, the set of weights based upon at least one previously predicted network latency;

predicting an expected amount of network latency, based upon the determined latency amounts stored by the network latency buffer and the corresponding identified set of weights;

updating the network latency category based upon the predicted expected network latency and at least one previously predicted network latency; and generating results in response to a user input received at a user interface, wherein the results are generated based upon a behavior policy corresponding to the network latency category for the mobile device.

11. The method of claim 10, wherein estimating the initial network latency category for the mobile device comprises:
receiving information indicating a connection type of the connection established by the mobile device; and
mapping the connection type to a network latency category.

12. The method of claim 11, wherein mapping the connection type to the network latency category comprises accessing a data structure storing mappings between a plurality of connection types and network latency categories.

13. The method of claim 10, wherein the behavior policy indicates whether to retrieve one or more results from a local results cache of the mobile device, based upon the network latency category for the mobile device.

14. The method of claim 13, further comprising:
retrieving, from the local results cache, one or more results from a first set of results corresponding to results of previous queries received from the user, based upon the received user input;
retrieving one or more additional results by:
based upon the behavior policy corresponding to the network latency category, determining whether to retrieve at least a portion of the one or more additional results from a second set of results stored by the local results cache corresponding to historical results previously retrieved from the server.

15. The method of claim 10, wherein determining an amount of latency of the network call to the server performed by the mobile device during the specified period of time comprises:
identifying at least one network call to the server performed during the specified period of time;
selecting a network call from the at least one network call satisfying one or more predetermined requirements.

16. The method of claim 10, wherein the network call to the server performed by the mobile device during the specified period of time corresponds to a periodic status update call.

17. The method of claim 10, wherein identifying the set of weights comprises:
comparing the amount of latency of the network call to a previously determined expected amount of latency;
in response to the amount of latency of the network call being greater than the previously determined expected amount of latency, identifying a first set of weights; and
in response to the amount of latency of the network call being less than the previously determined expected amount of latency, identifying a second set of weights.

18. A method, comprising:
receiving, via a user interface of a mobile device, input from a user corresponding to at least a portion of a query;
on the mobile device, retrieving from a results cache a first subset of results from a first set of stored results corresponding to results of previous queries received from the user, based upon the received query portion;
determining the network latency category for the mobile device by, for each of a plurality of time periods:
identifying a network call to the server performed by the mobile device over a current network connection during the period of time;
determining whether the network call completed during the period of time;
responsive to the network call completing during the period of time, determining an amount of latency of the network call, and adding the determined latency to a network latency buffer configured to store determined latency amounts corresponding to network calls performed during a plurality of previous periods of time;
responsive to the network call not completing during the period of time, adding to the network latency buffer a latency value based upon a total length of the period of time;
identifying a set of weights corresponding to each of the determined latency amounts stored by the network latency buffer, the set of weights based upon at least one previously predicted network latency;
predicting an expected amount of network latency, based upon the determined latency amounts stored by the network latency buffer and the corresponding identified set of weights;
determining the network latency category based upon the predicted expected network latency and at least one previously predicted network latency; and
retrieving a second subset of results corresponding to results of previous queries associated with a plurality of users, wherein retrieving the second subset of results comprises determining whether to retrieve at least a portion of the second subset of results from a second set of results stored by the results cache corresponding to historical results previously retrieved from a remote server, based upon the determined network latency category;
determining, for each result of the second subset of results, a match measure indicating a level at which the result matches the received query portion, and a popularity measure indicating a historical popularity level of the result among the plurality of users;
displaying to the user, a list of results comprising the first subset of results and at least a portion of the second subset of results based, wherein the portion of the second subset of results are selected based upon an aggregate measure for each result based upon the match measure and the popularity measure for the result.

19. The method of claim 18, further comprising, for each result of the second subset of results, determining a distance measure indicating a distance between a location of the user and a location associated with the respective result, and wherein the aggregate measure for the respective result is further based at least in part upon the determined distance measure.

20. The method of claim 18, wherein the aggregate measure for each result of the second subset of results is based upon the popularity measure of the result scaled based upon the match measure of the result.

* * * * *

UNITED STATES PATENT AND TRADEMARK OFFICE
CERTIFICATE OF CORRECTION

PATENT NO. : 10,673,722 B2
APPLICATION NO. : 16/182456
DATED : June 2, 2020
INVENTOR(S) : Lodhia et al.

It is certified that error appears in the above-identified patent and that said Letters Patent is hereby corrected as shown below:

In the Claims

In Column 25, in Claim 1, Line 26, delete "interlace" and insert -- interface --, therefor.

Signed and Sealed this
Twenty-second Day of December, 2020

Andrei Iancu
*Director of the United States Patent and Trademark Office*